United States Patent
O'Connor et al.

(10) Patent No.: US 7,594,469 B2
(45) Date of Patent: Sep. 29, 2009

(54) METHOD TO STEEP TEAS FOR THE OPTIMAL TIMES AND AT THE OPTIMAL STEEPING TEMPERATURES

(75) Inventors: Christian E. O'Connor, Boise, ID (US); Augusto Picozza, Boca Raton, FL (US); Patricia Bassett, Boca Raton, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 606 days.

(21) Appl. No.: 11/450,730

(22) Filed: Jun. 9, 2006

(65) Prior Publication Data

US 2007/0283815 A1    Dec. 13, 2007

(51) Int. Cl.
*A47J 31/00* (2006.01)
(52) U.S. Cl. .............................. 99/282; 99/283; 99/299; 99/303; 99/308
(58) Field of Classification Search ................ 99/303, 99/283, 282, 308, 299, 319, 320; 426/435, 426/433

See application file for complete search history.

(56) References Cited

U.S. PATENT DOCUMENTS

| | | | |
|---|---|---|---|
| 4,303,196 A * | 12/1981 | Raines et al. | ................. 236/88 |
| 4,809,594 A | 3/1989 | Vitous | |
| 5,188,019 A | 2/1993 | Vahabpour | |
| 5,245,914 A | 9/1993 | Vitous | |
| 5,715,742 A * | 2/1998 | Cheich et al. | ................. 99/308 |
| 6,095,031 A | 8/2000 | Warne | |
| 6,135,010 A | 10/2000 | Husted | |
| 6,139,888 A | 10/2000 | Knepler | |

(Continued)

FOREIGN PATENT DOCUMENTS

DE        38 01 896        8/1989

(Continued)

OTHER PUBLICATIONS http://www.teachat.com/viewtopic.php?t=2760, "Anybody Watch American Inventor . . . cool tea contraption" by "snuvidkid", Jul. 18, 2007.

(Continued)

*Primary Examiner*—Reginald L Alexander
(74) *Attorney, Agent, or Firm*—Lawrence J. Shurupoff

(57) ABSTRACT

An apparatus for brewing tea in accordance with an aspect of the invention includes a brew chamber that holds water. An infuser disposed in the chamber holds tea leaves and allows the water to contact the tea leaves. A heater heats the water in the brew chamber. A control sets a tea characteristic of the tea leaves. The tea characteristic can include one or both of tea format (loose or bagged) and tea type. The control can also set tea strength. A control circuit communicates with the heater. The control circuit controls power to the heater to heat the water to a steep temperature and then controls power to the heater to maintain the steep temperature for a steep time. The control circuit determines the steep temperature and the steep time based on the set tea characteristic or characteristics. It can further determine steep time based on the set tea strength. The tea leaves steep in the heated water until the expiration of the steep time to produce a brewed tea.

15 Claims, 7 Drawing Sheets

U.S. PATENT DOCUMENTS

| | | | |
|---|---|---|---|
| 6,170,387 B1 * | 1/2001 | Cheung | 99/299 |
| RE37,173 E | 5/2001 | Jefferson, Jr. | |
| 6,237,811 B1 | 5/2001 | Ford | |
| 6,250,208 B1 | 6/2001 | Helps | |
| 6,526,872 B2 * | 3/2003 | Wong | 99/282 |
| 6,565,906 B1 | 5/2003 | Lassota | |
| 6,571,685 B1 | 6/2003 | Lassota | |
| 6,612,224 B2 * | 9/2003 | Mercier et al. | 99/282 |
| 6,805,042 B2 | 10/2004 | Mordini | |
| 6,964,222 B1 | 11/2005 | Tucker | |
| 2005/0199127 A1 | 9/2005 | Wimmer et al. | |

FOREIGN PATENT DOCUMENTS

| | | |
|---|---|---|
| DE | 40 41 328 | 6/1992 |
| DE | 102 49 225 | 4/2004 |
| JP | 5285049 * | 5/1993 |

OTHER PUBLICATIONS http://www.realitytvcalendar.com/recaps/americaninventor2/ep07-9143-pl.html, "American Inventor —Picking The Top Three of Six" Episode 7 Recap by Gayl Killough, Jul. 26, 2007.

http://www.realitytvworld.com/news/abc-american-inventor-reveals-its-fiinal-two-second-s . . . , "ABC's 'American Inventor' Reveals its final two second season finalists" by Christopher Rocchio, Jul. 19, 2007.

* cited by examiner 218-1

| | LOOSE TEA | | |
|---|---|---|---|
| | STEEP TEMP ± 3°C | STEEP TIME ± 5% (TEA STRENGTH =-1) | STEEP TIME ± 5% (TEA STRENGTH = 0) | STEEP TIME ± 5% (TEA STRENGTH = 1) |
| BLACK TEA | 95C (203F) | 3:00 | 4 MIN | 5:00 |
| OOLONG TEA | 95C (203F) | 2:15 | 3 MIN | 3:45 |
| GREEN TEA | 85C (185F) | 2:15 | 3 MIN | 3:45 |
| WHITE TEA | 85C (185F) | 3:45 | 5 MIN | 6:15 |
| HERBAL TEA | 85C (185F) | 2:40 | 3.5 MIN | 4:20 |

218-2

| | BAGGED TEA | | |
|---|---|---|---|
| | STEEP TEMP ± 3°C | STEEP TIME ± 5% (TEA STRENGTH =-1) | STEEP TIME ± 5% (TEA STRENGTH = 0) | STEEP TIME ± 5% (TEA STRENGTH = 1) |
| BLACK TEA | 95C (203F) | 4:30 | 6 MIN | 7:30 |
| OOLONG TEA | 95C (203F) | 3:45 | 5 MIN | 6:15 |
| GREEN TEA | 85C (185F) | 3:45 | 5 MIN | 6:15 |
| WHITE TEA | 85C (185F) | 5:15 | 7 MIN | 8:45 |
| HERBAL TEA | 85C (185F) | 4:10 | 5.5 MIN | 6:50 |

Fig-6B

METHOD TO STEEP TEAS FOR THE OPTIMAL TIMES AND AT THE OPTIMAL STEEPING TEMPERATURES

FIELD

The present disclosure relates to methods for controlling beverage brewing cycles.

BACKGROUND

The statements in this section merely provide background information related to the present disclosure and may not constitute prior art.

Tea consumption in the United States is increasing as the public discovers the health benefits of tea drinking. The public is also discovering a diverse assortment of teas, each with a unique flavor and aroma. The diversity of teas gives rise to diverse requirements for steeping time and temperature to extract the teas' unique flavors and aromas.

Steeping times and temperatures to extract optimal flavor from each of five principle tea types, of which each includes many varieties, are different. Additionally, tea packaged and brewed in portion-size bags or tea bags, which can be constructed of paper, silk, nylon, and/or other materials, extracts at a different rate than tea steeped as loose leaves. Current methods require that a tea preparer be aware that differences in steeping requirements exist, remember the optimal times and temperatures for each tea type, and use thermometers and/or heating devices to achieve and maintain the proper times and temperatures to produce the best tasting cup of tea. The important parameters of time and temperature may be left to chance and leave the tea drinker with a taste experience that fails to meet his expectations. Known methods and devices to help the tea drinker solve the problem of steeping a particular tea at the appropriate temperature for the appropriate amount of time include published tables in books or articles, instructions printed on the tea package by a tea provisioner, trial and error, and tribal knowledge.

SUMMARY

An apparatus and method for brewing tea in accordance with an aspect of the invention includes a brew chamber that holds water. An infuser disposed in the chamber holds tea leaves and allows the water to contact the tea leaves. A heater heats the water in the brew chamber. A control sets a tea characteristic of the tea leaves. A control circuit, coupled to the control and the heater, controls power to the heater to heat the water to a steep temperature and then controls power to the heater to maintain the steep temperature for a steep time. The control circuit determines the steep temperature and the steep time based on the set tea characteristic. The tea leaves steep in the heated water to produce a brewed tea.

In an aspect, the tea characteristic includes one or both of a tea leaf format and a tea type. In an aspect, the tea leaf format can be loose tea leaves or bagged tea leaves. In an aspect, the tea type can include one of a plurality of tea types, such as black, oolong, green, white and herbal teas.

In an aspect, the control includes a tea format control and a tea type control and the control circuit determines the steep temperature based on the tea type set by the tea type control and the steep time based on the tea format set by the tea format control. In an aspect, the control further includes a tea strength control and the control circuit further determines the steep time based on the tea strength set by the tea strength control.

In an aspect, the control circuit includes a memory in which data for steep times and steep temperatures for different tea types and formats are stored. In an aspect, the data further includes steep times for different tea strengths.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DRAWINGS

The drawings described herein are for illustration purposes only and are not intended to limit the scope of the present disclosure in any way.

FIG. 6B shows look-up tables for the method of FIG. 6A.

DETAILED DESCRIPTION

Figure 1:
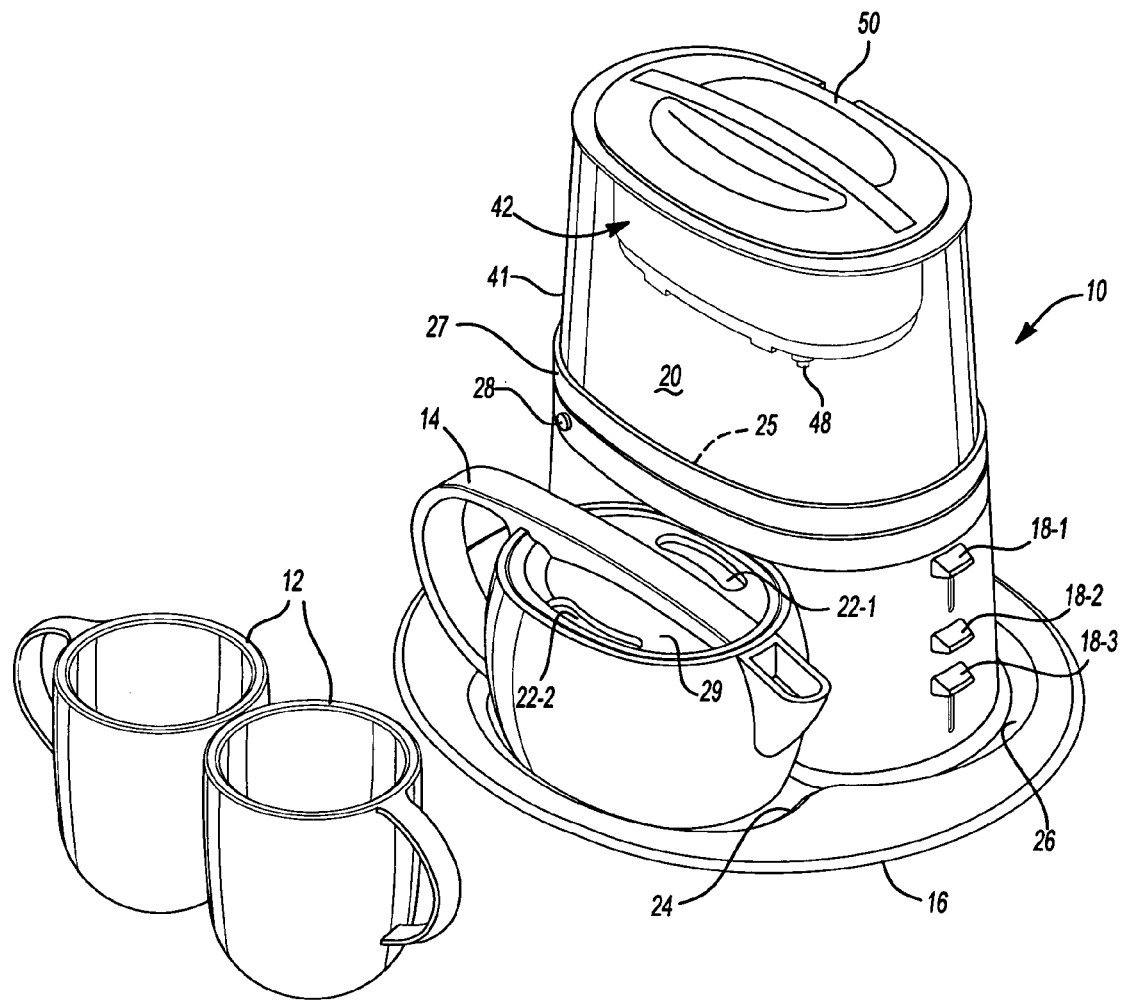
FIG. 1 shows a perspective view of a tea-brewing appliance and accessories in accordance with an aspect of the invention.

The following description is merely exemplary in nature and is not intended to limit the present disclosure, application, or uses. It should be understood that throughout the drawings, corresponding reference numerals indicate like or corresponding parts and features.

Referring now to FIG. 1, a tea-making appliance 10 in accordance with an aspect of the invention is shown with accessories such as cups 12, a tea pot or carafe 14, and a tray 16. Tray 16 includes an hourglass-shaped recess including a first region 24 and a second region 26. First region 24 receives a base of carafe 14. Second region 26 receives a base of appliance 10 or cups 12. Appliance 10 includes a concave portion for receiving a side portion of carafe 14. When carafe 14 and appliance 10 are positioned in first region 24 and second region 26, respectively, the concave portion receives and positions one of openings 22-1 and 22-1 in carafe 14 under a dispensing spout of appliance 10. Openings 22 can be formed in a lid 29 of carafe 14. The spout is located within an overhanging portion 27 of appliance 10 and a valve 25 controls the flow of brewed tea through the spout. Appliance 10 includes an indicator 28, such as a buzzer, lamp, and/or light-emitting diode (LED) that signals when the tea is brewing and/or ready. After appliance 10 dispenses the brewed tea into carafe 14, appliance 10 may be removed from tray 16 and replaced with one or more cups 12.

Appliance 10 includes a tea strength control switch 18-1 for selecting brewed tea strength, a tea format control switch 18-2 for selecting a tea leaf format, and a tea type control switch 18-3 for selecting a tea type. In this regard, as used herein, the tea leaf format and tea type are characteristics of the tea to be brewed, whereas the tea strength is a user preference. Examples of tea leaf formats include loose tea leaves and bagged tea leaves. Examples of tea types include black, oolong, green, white, and herbal teas. Appliance 10 also includes an on/off or power control switch 18-4 (shown in FIG. 2). Tea strength control switch 18-1, tea format control switch 18-2, tea type control switch 18-3, and power control switch 18-4 are collectively referred to as controls 18. Tea strength control switch 18-1 and tea type control switch 18-3 may illustratively be multi-position selector type switches and tea format control switch 18-2 and power control switch 18-4 may illustratively be on/off type switches. Each may be referred to herein as a switch. It should be understood that controls 18 could be devices other than switches. For example, tea strength control switch 18-1 and tea type control switch 18-3 could be potentiometers.

Figure 2:
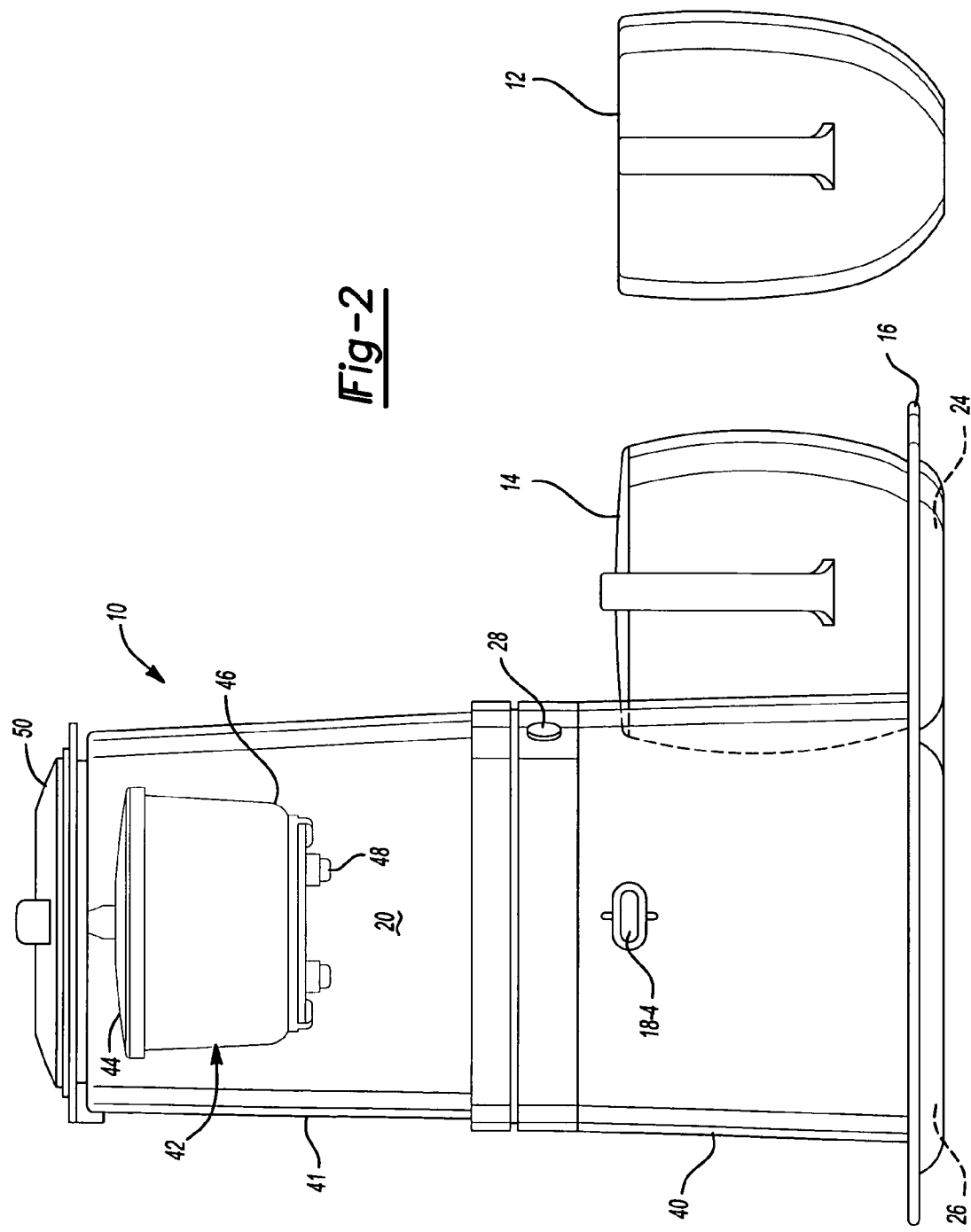
FIG. 2 shows a side view of the tea-making appliance and accessories of FIG. 1.
Figure 3:
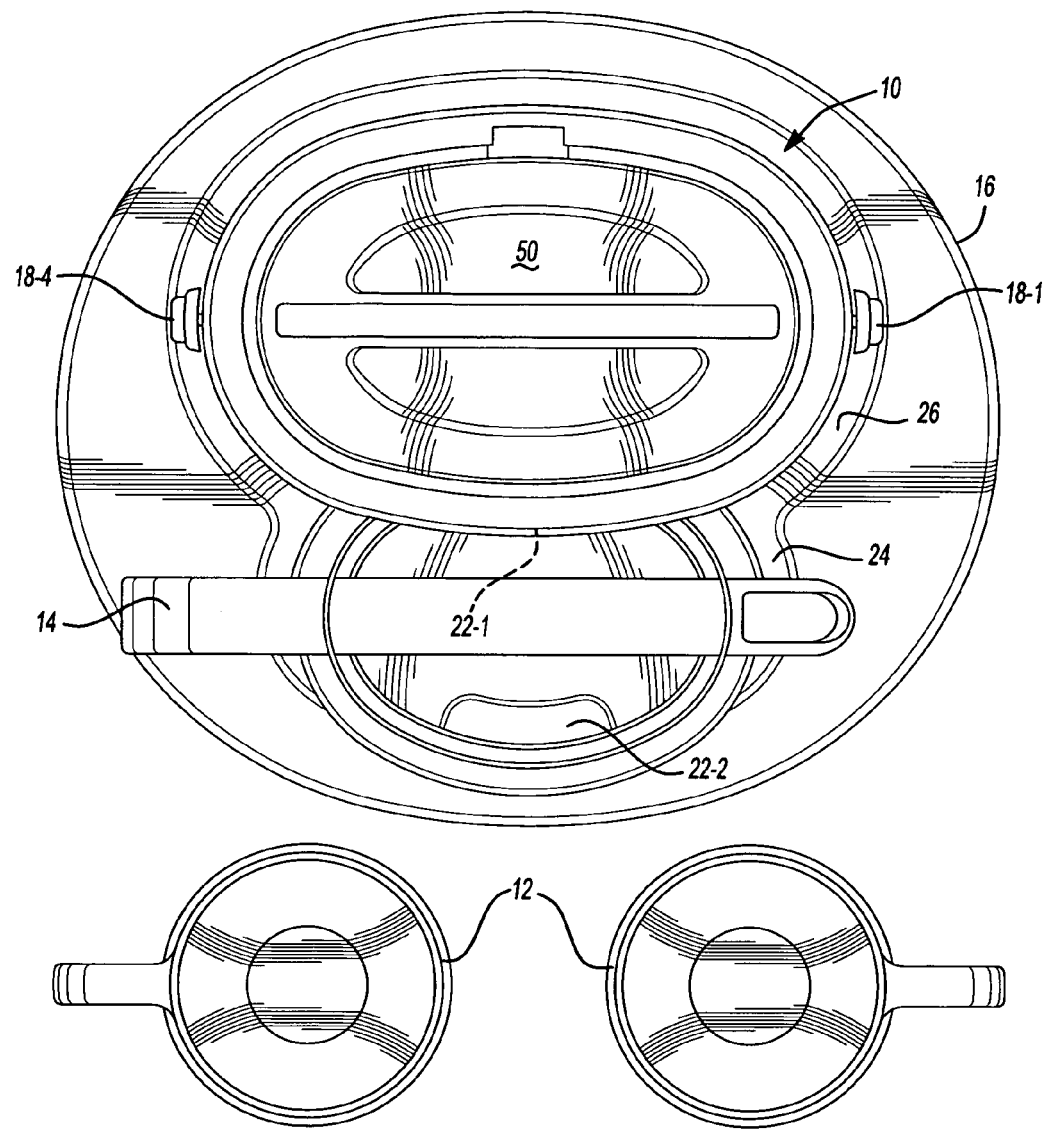
FIG. 3 shows a top view of the tea-making appliance and accessories of FIG. 1.

As best shown in FIG. 2, appliance 10 also includes a brew chamber 20 that rests upon a base 40. Base 40 houses a control circuit 100 (FIG. 5) that controls various aspects of appliance 10. Appliance 10 dispenses the brewed tea into carafe 14 through one of openings 22-1 and 22-2 depending on an orientation of carafe 14.

Figure 4:
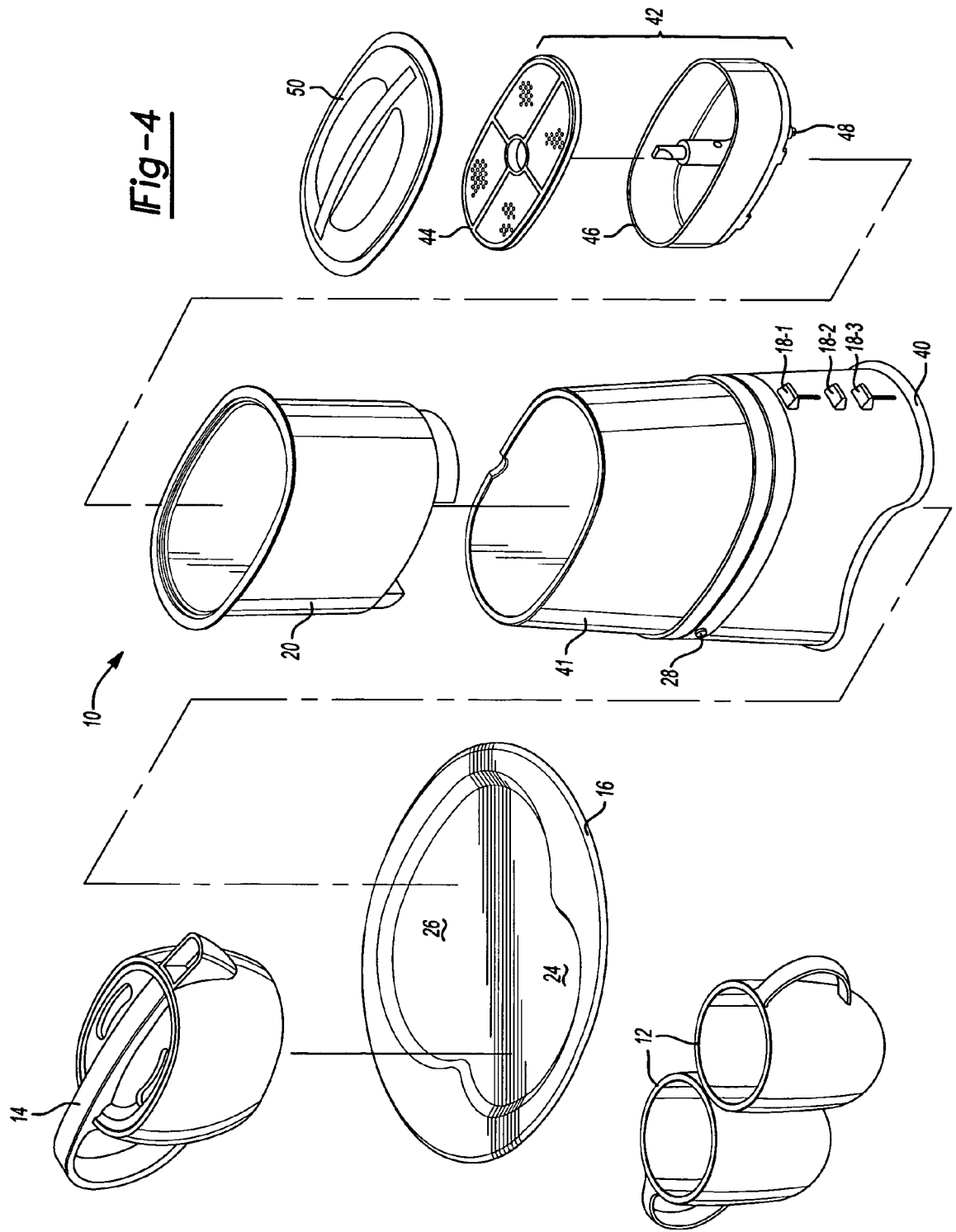
FIG. 4 shows an exploded view of the tea-making appliance and accessories of FIG. 1.

Referring now to FIG. 4, an exploded view is shown of appliance 10 and the accessories. Prior to operation, carafe 14 and base 40 are positioned on tray 16. Brew chamber 20 is then filled with a predetermined amount of water based on the amount of tea to be brewed. Brew chamber 20 is then placed on base 40. Base 40 can include a shroud 41 that helps prevent a user from touching brew chamber 20 while appliance 10 is operating. In some embodiments brew chamber 20 and/or shroud 41 can be made of a translucent material.

A tea infuser assembly 42 includes a perforated lid 44 that fits onto a tea basket 46. A wall of basket 46 includes a valve 48 that opens above a predetermined temperature. In some embodiments valve 48 includes a bimetal valve. Valve 48 prevents the water in brew chamber 20 from entering infuser assembly 42 until the water is heated to a predetermined temperature to brew the tea. In some embodiments, the predetermined temperature is about 65° C.

To brew tea, tea leaves (not shown) are placed into basket 46 and lid 44 is then placed upon basket 46. Infuser assembly 42 is then lowered into brew chamber 20. A lid 50 is then positioned on top of brew chamber 20 and tea strength control switch 18-1, tea format control switch 18-2, and tea type control switch 18-3 are set accordingly. Power control switch 18-4 is then switched to an on-position to start appliance 10 brewing tea as described in more detail below.

Figure 5:
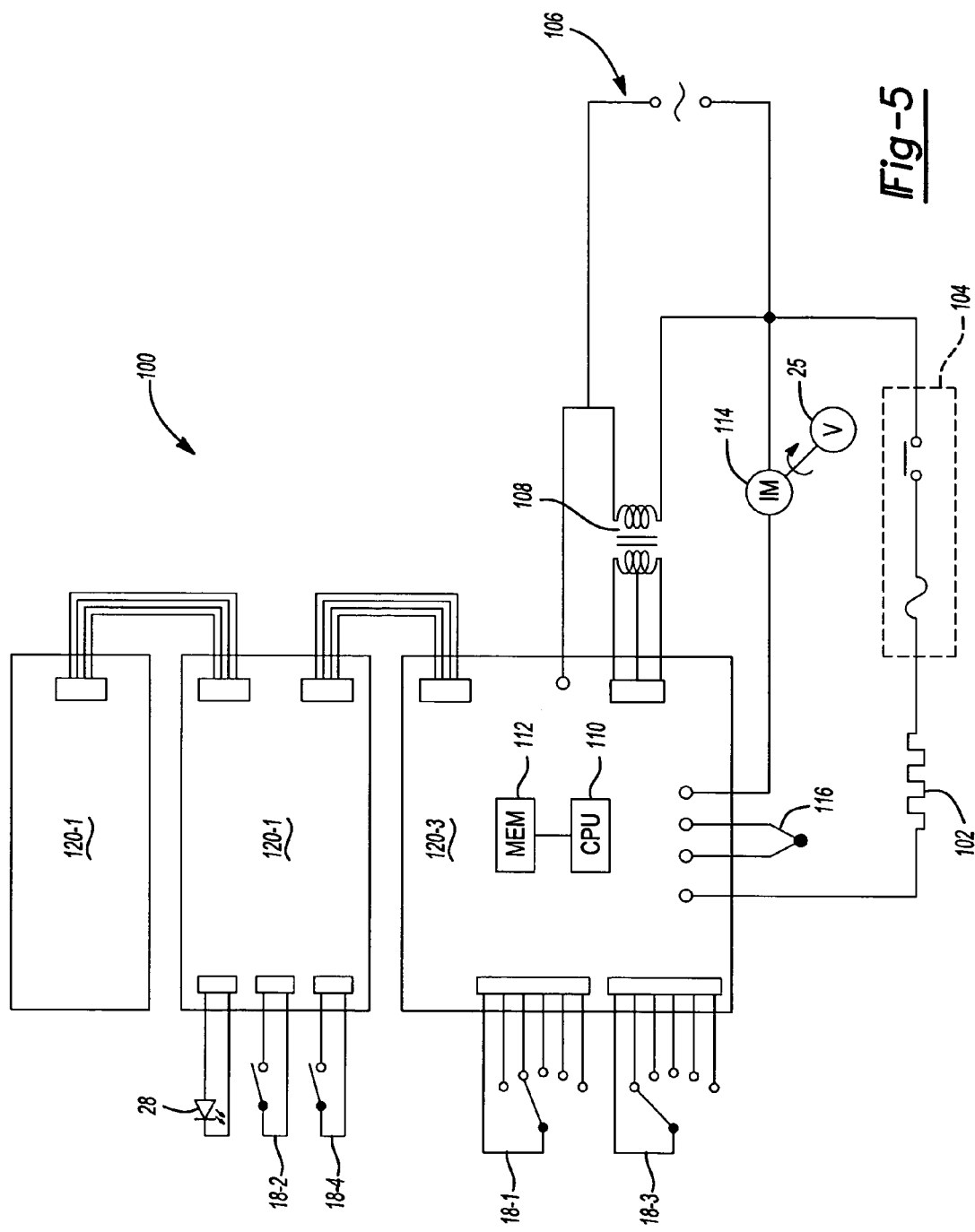
FIG. 5 shows an electrical diagram of the tea-making appliance of FIG. 1.

Referring now to FIG. 5, electrical circuit 100 of appliance 10 is shown. Circuit 100 includes components attached to one or more printed circuit boards (PCB) 120. PCBs 120 facilitate mounting circuit 100 within base 40. Circuit 100 receives power through a secondary winding of a transformer 108. A primary winding of transformer 108 connects to a wall plug 106. A motor 114 drives the dispense valve 25 that is located in base 40. In some embodiments motor 114 includes a synchronous induction motor. In some embodiments motor 114 is associated with a position feedback circuit that indicates a rotational position of motor 114 and/or dispense valve 25. A heating element 102 heats the water in brew chamber 20. A temperature sensor 116 generates an electrical temperature signal based on the water temperature in brew chamber 20. In some embodiments the temperature sensor 116 includes a resistive thermal device (RTD).

A central processing unit (CPU) 110 communicates with an associated memory 112. Memory 112 includes program instructions that are executed by CPU 110 to control appliance 10, such as in accordance with a control method 200 that is described below.

Figure 6A:
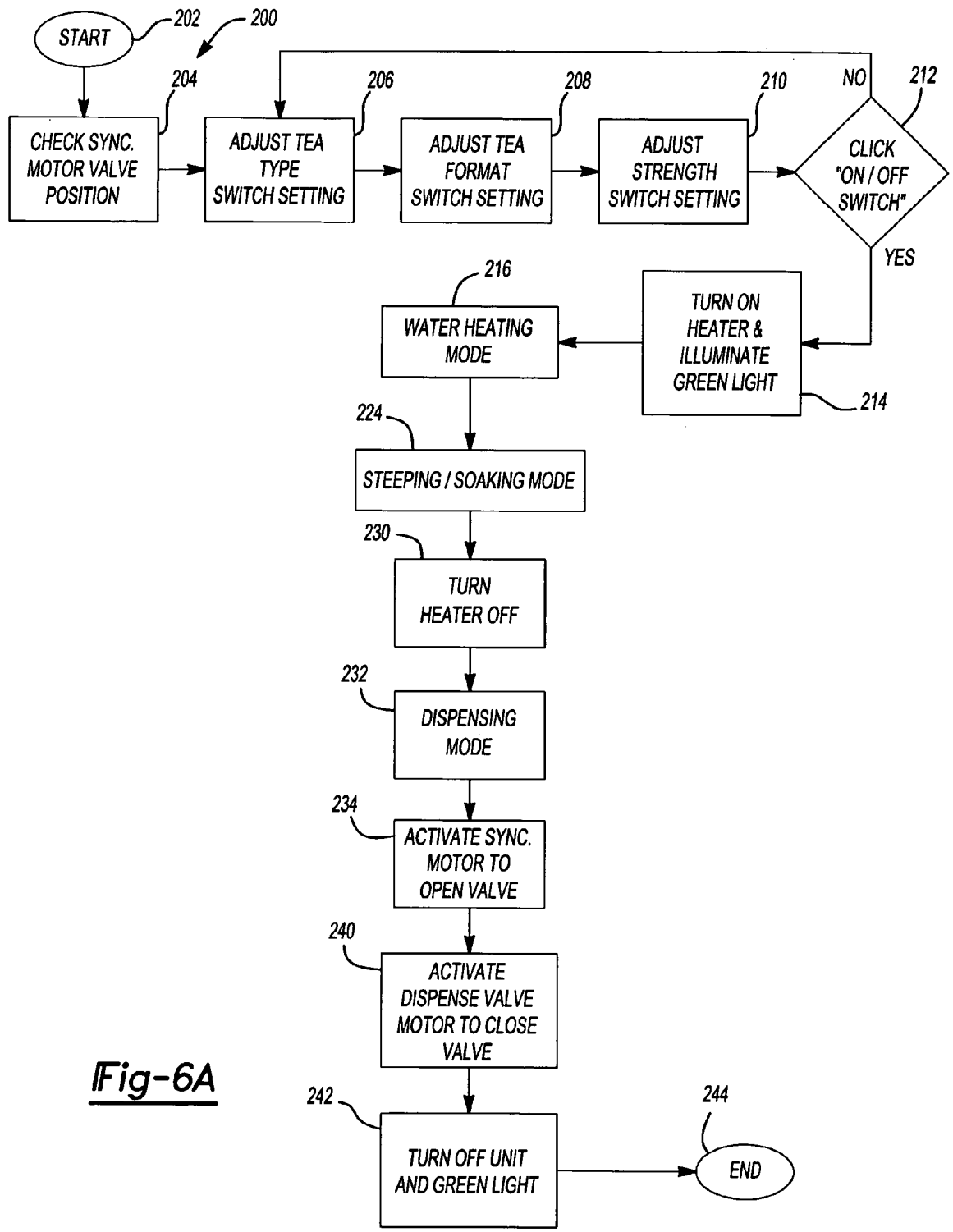
FIG. 6A shows a method for steeping teas in accordance with an aspect of the invention.

Referring now to FIG. 6A, control method 200 that CPU 110 executes in controlling appliance 10 is described. Control method 200 begins at block 202 and immediately proceeds to block 204. In block 204 a timer, illustratively implemented in CPU 110, is reset and it is assured that motor 114 has closed the dispense valve 25. Signals from tea strength control switch 18-1, tea format control switch 18-2, and tea type control switch 18-3 are read at blocks 206, 208, and 210. At decision block 212, on/off power control switch 18-4 is checked. If on/off power control switch 18-4 is off then control returns to block 206 and repeats blocks 206-210. If on/off power control switch 18-4 is on then control branches to block 214 where heater 102 is turned on and indicator 28 is activated. Control then proceeds to block 216 to execute a water heating mode.

In the water heating mode, CPU 110 repeatedly compares the temperature signal to a set-point temperature, referred to herein as the steep temperature. In an aspect, the steep temperature is determined by CPU 110 based on the tea type set by tea type control switch 18-3. In another aspect, CPU 110 could further determine the steep temperature based on the tea format set by tea format control switch 18-2. In an aspect, CPU 110 obtains the steep temperature from steep temperature data in tables 218-1 and 218-2, which are shown in FIG. 6B. Tables 218-1 and 218-2 are stored in memory 112 and read by CPU 110. Tea type control switch 18-3 and/or tea format control switch 18-2 is also monitored to determine if they have changed from their settings read in block 206. If the tea format control switch 18-2 and/or the tea type control switch 18-3 settings change, the set-point temperature is updated based on the new settings.

The water temperature reaches the opening temperature of valve 48 at some time during the water heating mode. Valve 48 then opens, allowing the heated water to enter infuser assembly 42 (FIG. 1) and begin to soak the tea leaves.

A soaking/steeping mode begins in block 224 when the water temperature in brew chamber 20 reaches the steep temperature. During the soaking/steeping mode CPU 110 cycles heater 102 on and off to maintain the water at the steep temperature. The soaking/steeping mode continues for a steep time that is determined by CPU 110 based on one or more of tea type, tea format and tea strength. In an aspect, CPU determines the steep time based on the settings of tea type control switch 18-3, tea format control switch 18-2, and tea strength control switch 18-1. The appropriate steep time is obtained from steep time data from tables 218-1 and 218-2. In the embodiment shown in FIG. 6B, tea strength control switch 18-1 can be set to provide three tea strengths for each tea type and tables 218-1 and 218-2 include data of each of the tea strengths. It should be understood, however, that more or less than three tea strengths for each tea type can be provided. In which case, tea strength data, such as steep time, is provided in tables 218-1 and 218-2 for the tea strengths that can be set with tea strength control switch 18-1. The settings of tea strength control switch 18-1, tea format control switch 18-2 and tea type control switch 18-3 are also monitored to determine if any of them have changed from their settings in blocks 206-210. If any of their settings change, then the steep time is updated accordingly. In an aspect, steep time begins when the temperature of the water in the brew chamber reaches the steep temperature.

The brewed tea is ready when the steep time expires. Heater 102 is then turned off in block 230. In block 234, motor 114 opens dispense valve 25 for a predetermined time, which allows appliance 10 to dispense the brewed tea into carafe 14 (FIG. 1). The predetermined dispense time is selected so that it is long enough to allow the brewed tea to empty from brew chamber 20 into carafe 14. At the expiration of the dispense time motor 114 closes dispense valve 25 and resets the timer at block 240. Indicator 28 is then turned off at block 242.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An apparatus for brewing tea, comprising:
 a brew chamber that holds water;
 an infuser disposed in the chamber that holds tea leaves and allows the water to contact the tea leaves, wherein the infuser includes a valve that opens when the water in the brew chamber reaches a predetermined temperature allowing heated water in the brew chamber to flow into the infuser;
 a heater that heats the water in the brew chamber;
 a control that sets a tea characteristic of the tea leaves;
 a control circuit in communication with the heater, wherein the control circuit controls power to the heater to heat the water to a steep temperature and then controls power to the heater to maintain the steep temperature for a steep time, the control circuit determining the steep temperature and the steep time based on the set tea characteristic and wherein the tea leaves steep in the heated water to produce a brewed tea; and
 wherein the predetermined temperature is lower than the steep temperature and the steep time begins when the water in the brew chamber reaches the steep temperature,
 wherein the control includes a user settable tea format control that is set to select whether the tea format is bagged or loose, the control circuit basing the steep time on the tea format set by the tea format control.

2. The apparatus of claim 1 wherein the tea characteristic includes a tea type, the control includes a tea type control and the control circuit determines the steep temperature based on the tea type set by the tea type control.

3. The apparatus of claim 2 wherein the tea type includes at least two of a black, oolong, green, white, or herbal tea.

4. The apparatus of claim 2 wherein the control includes a user settable tea strength control that is set to select a tea strength, the control circuit further basing the steep time on the tea strength set by the tea strength control.

5. The apparatus of claim 1 wherein the control further includes a user settable tea strength control that is set to select a tea strength, the control circuit further basing the steep time on the tea strength set by the tea strength control.

6. The apparatus of claim 1 further including a temperature sensor coupled to the control circuit that generates a temperature signal based on water temperature in the brew chamber.

7. The apparatus of claim 1 wherein control circuit includes a memory in which data is stored for steep times and steep temperatures for each settable tea characteristic, the control circuit determining the steep time and steep temperature from the data stored in the memory based on the set tea characteristic.

8. The apparatus of claim 2 wherein the control circuit includes a memory in which data for steep times and steep temperatures for each settable tea type is stored, the control circuit determining the steep time and steep temperature from the data stored in the memory based on the set tea type.

9. The apparatus of claim 2 wherein the control circuit includes a memory in which data for steep times and steep temperatures for each settable tea type in each settable tea format is stored, the control circuit determining the steep time and steep temperature from the data stored in the memory based on the set tea format and the set tea type.

10. The apparatus of claim 4 wherein the control circuit includes a memory in which data is stored for steep times and steep temperatures for each settable tea type at each settable tea strength, the control circuit determining the steep time and steep temperature from the data stored in the memory based on the set tea type and the set tea strength.

11. The apparatus of claim 5 wherein the control circuit includes a memory in which data is stored for steep times and steep temperatures for each settable tea format at each settable tea strength, the control circuit determining the steep time from the data stored in the memory based on the set tea format and the set tea strength.

12. An apparatus for brewing tea, comprising:
 a brew chamber that holds and heats water;
 an infuser disposed in the brew chamber that holds tea leaves, the infuser having a valve that opens when the water in the brew chamber reaches a predetermined temperature allowing heated water in the brew chamber to flow in to the infuser;
 a control circuit including a memory in which data for steep times and steep temperatures for different tea types in different tea formats and at different tea strengths is stored;
 a first user settable control coupled to the control circuit for setting whether the tea format is loose or bagged;
 a second user settable control coupled to the control circuit for setting the tea type;
 a third user settable control coupled to the control circuit for setting the tea strength;
 the control circuit determining a steep time and a steep temperature based on the tea format set by the first user settable control, the tea type set by the second user settable control and the tea strength set by the third user settable control;
 the control circuit heating water in the brew chamber to the steep temperature and maintaining the water in the brew chamber at the steep temperature until the expiration of the steep time, the steep time beginning when the water in the brew chamber reaches the steep temperature.

13. A method of brewing tea in a tea brewing apparatus having a brew chamber, a tea infuser disposed therein in which tea leaves are held, and a user settable control for setting a tea characteristic, comprising:
 storing data in a memory of the tea brewing apparatus;
 determining a steep time and a steep temperature based on the set tea characteristic;
 heating water in the brew chamber to the steep temperature and maintaining the water at the steep temperature until the steep time expires;
 triggering a temperature-dependent valve on the tea infuser at a predetermined temperature allowing heated water in the brew chamber to flow into the tea infuser to contact the tea leaves to begin steeping the tea leaves, the predetermined temperature being lower than the steep temperature; and
 steeping the tea leaves in the heated water for the steep time,
 wherein the tea characteristic includes a tea format and a tea type, the user settable control includes a user settable tea format control that is set to select whether the tea format is bagged or loose and a user settable control that is set to select the tea type, and determining the steep time and steep temperature includes determining the steep time and steep temperature from data stored in a memory of the tea brewing apparatus based on the set tea format and set tea type, the data including steep times and steep temperatures for each settable tea type in each settable tea format.

14. The method of claim 13 wherein the tea characteristic further includes a user settable tea strength control that is set to select a tea strength, and determining the steep time and steep temperature includes determining the steep time and steep temperature from data stored in a memory of the tea brewing apparatus based on the set tea format and set tea type and set tea strength, the data including steep times and steep temperatures for each settable tea type in each settable tea format at each settable tea strength.

15. The method of claim 13 wherein the tea format includes loose or bagged, and the tea type includes at least two of a black, oolong, green, white or herbal tea.

* * * * *